No. 721,667. PATENTED MAR. 3, 1903.
W. H. BUTLER.
MACHINE FOR MAKING AND FILLING BOXES.
APPLICATION FILED MAY 3, 1900.
NO MODEL. 10 SHEETS—SHEET 4.
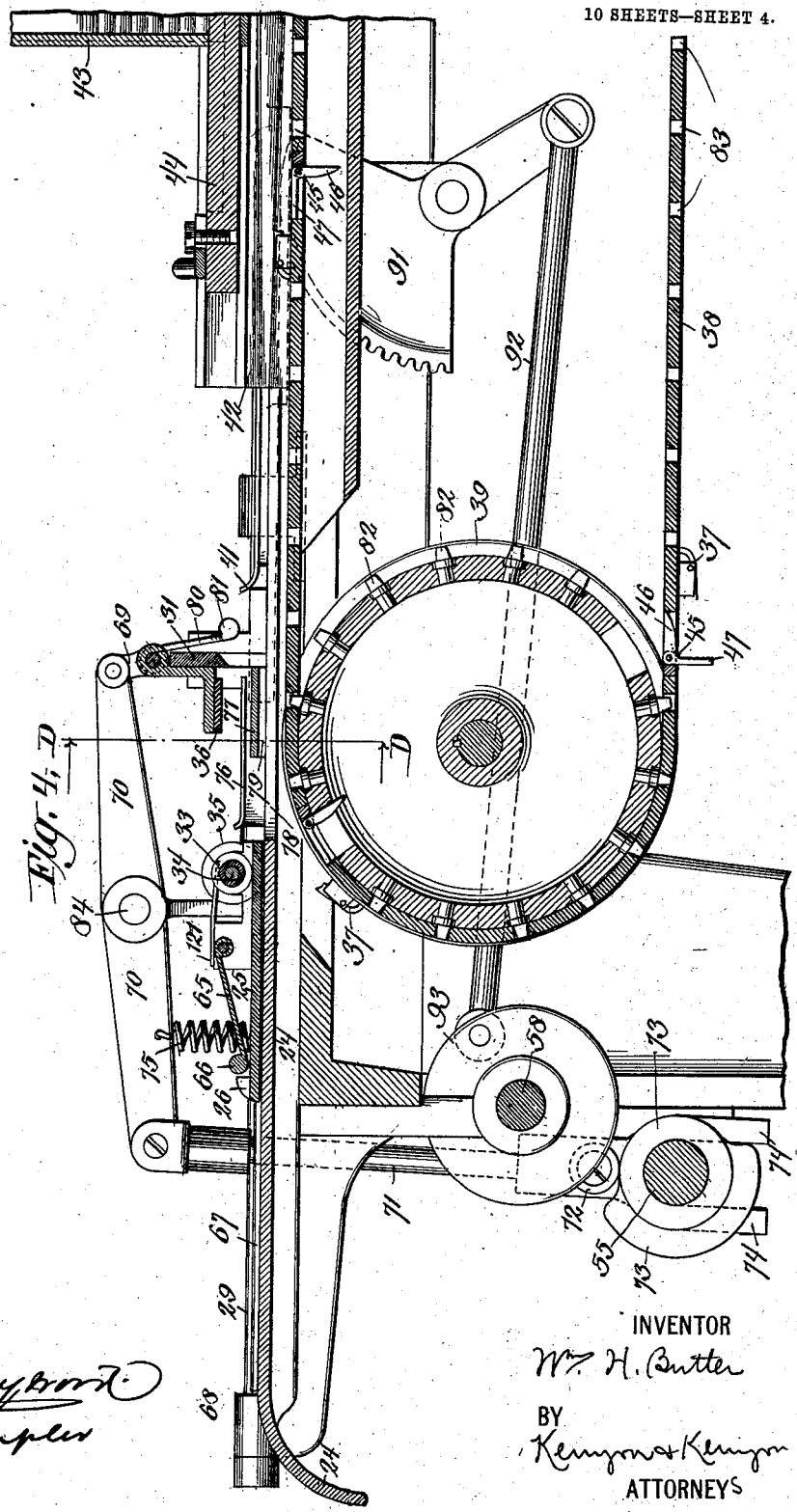

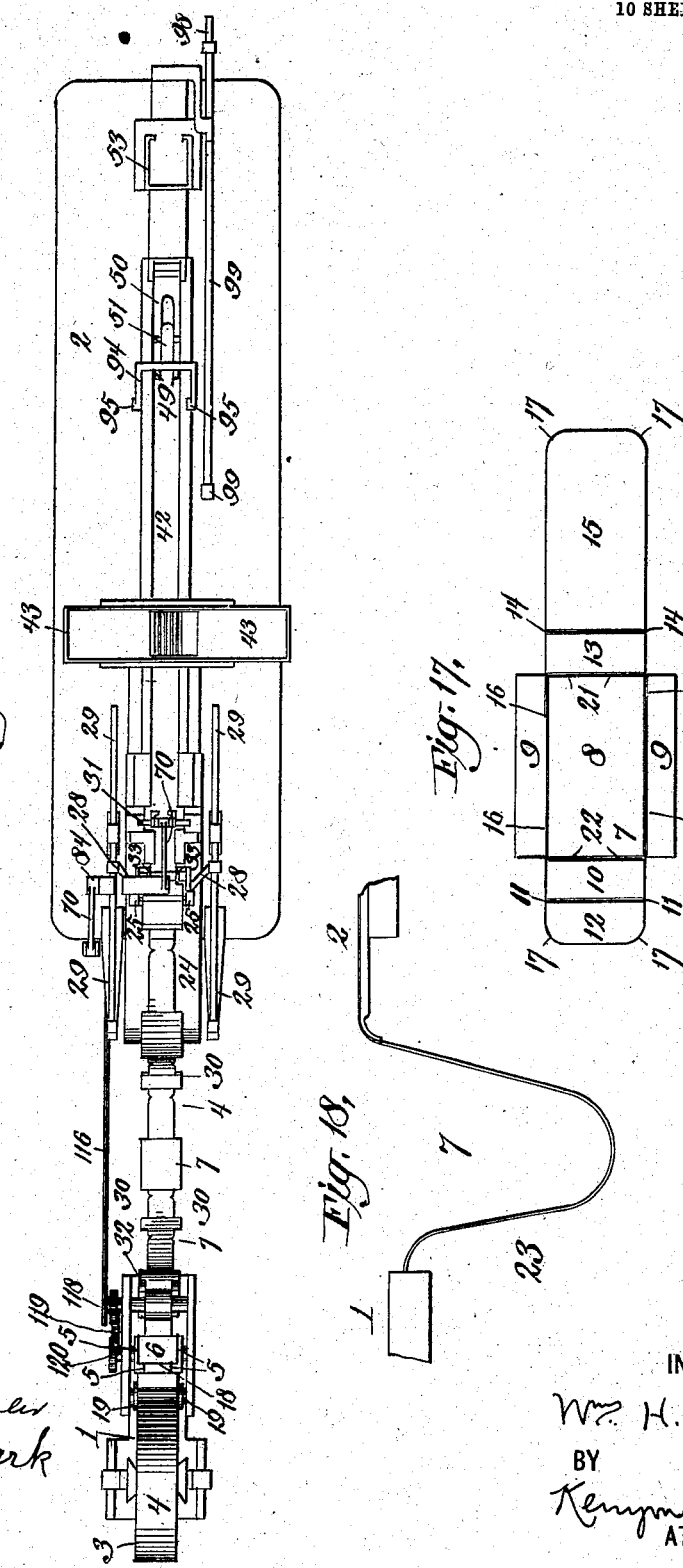

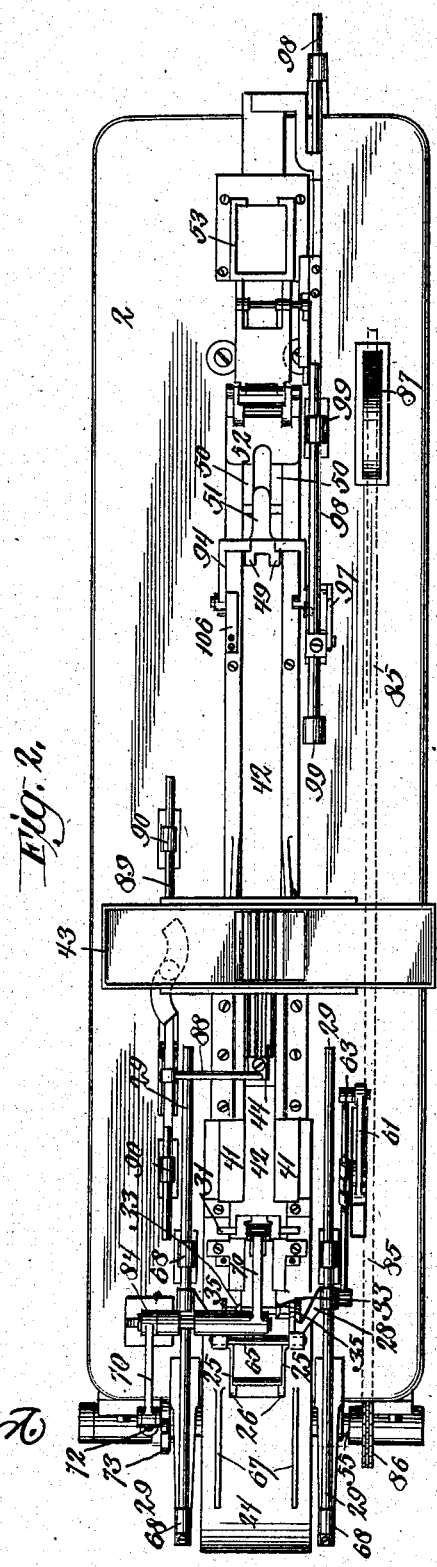

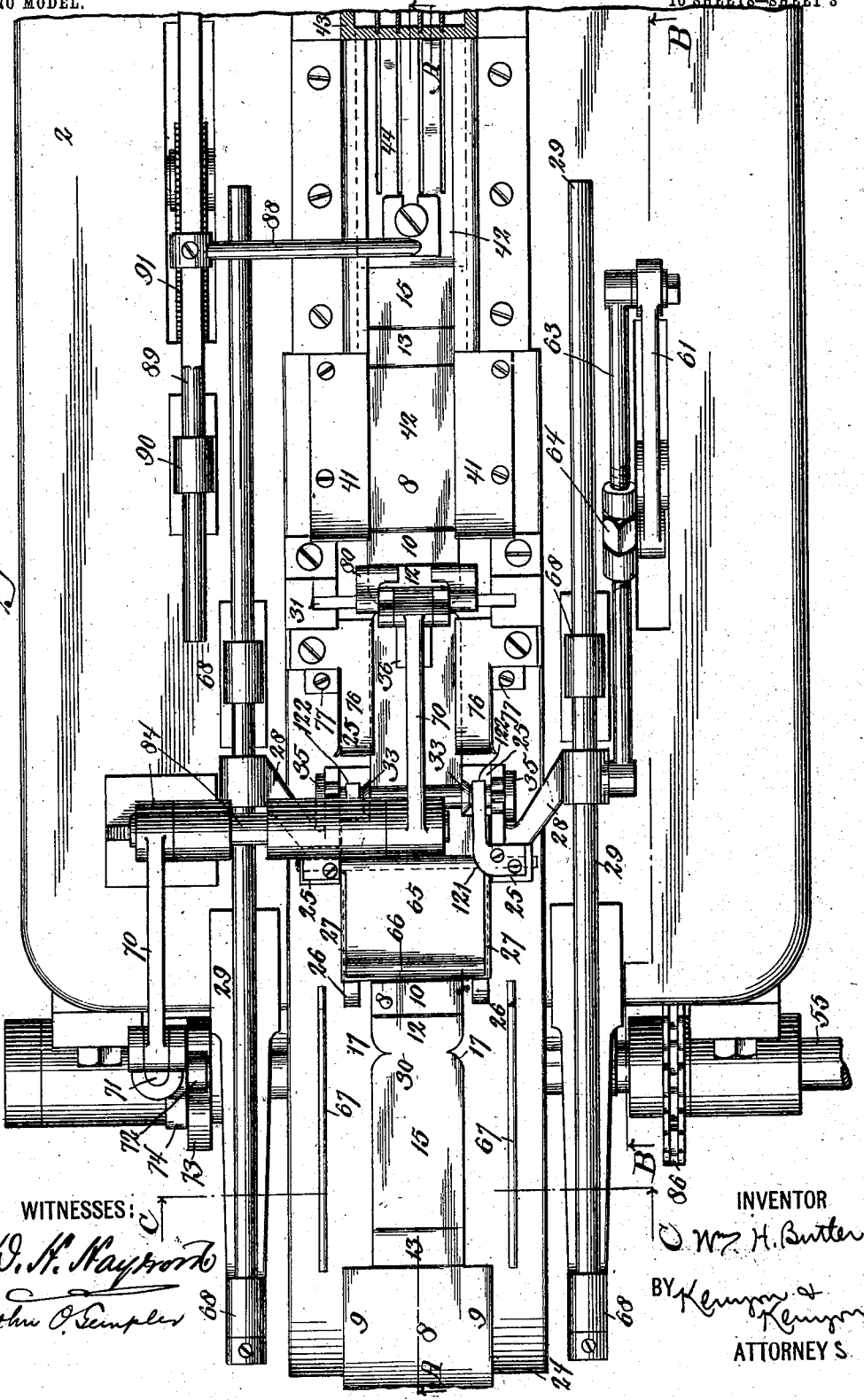

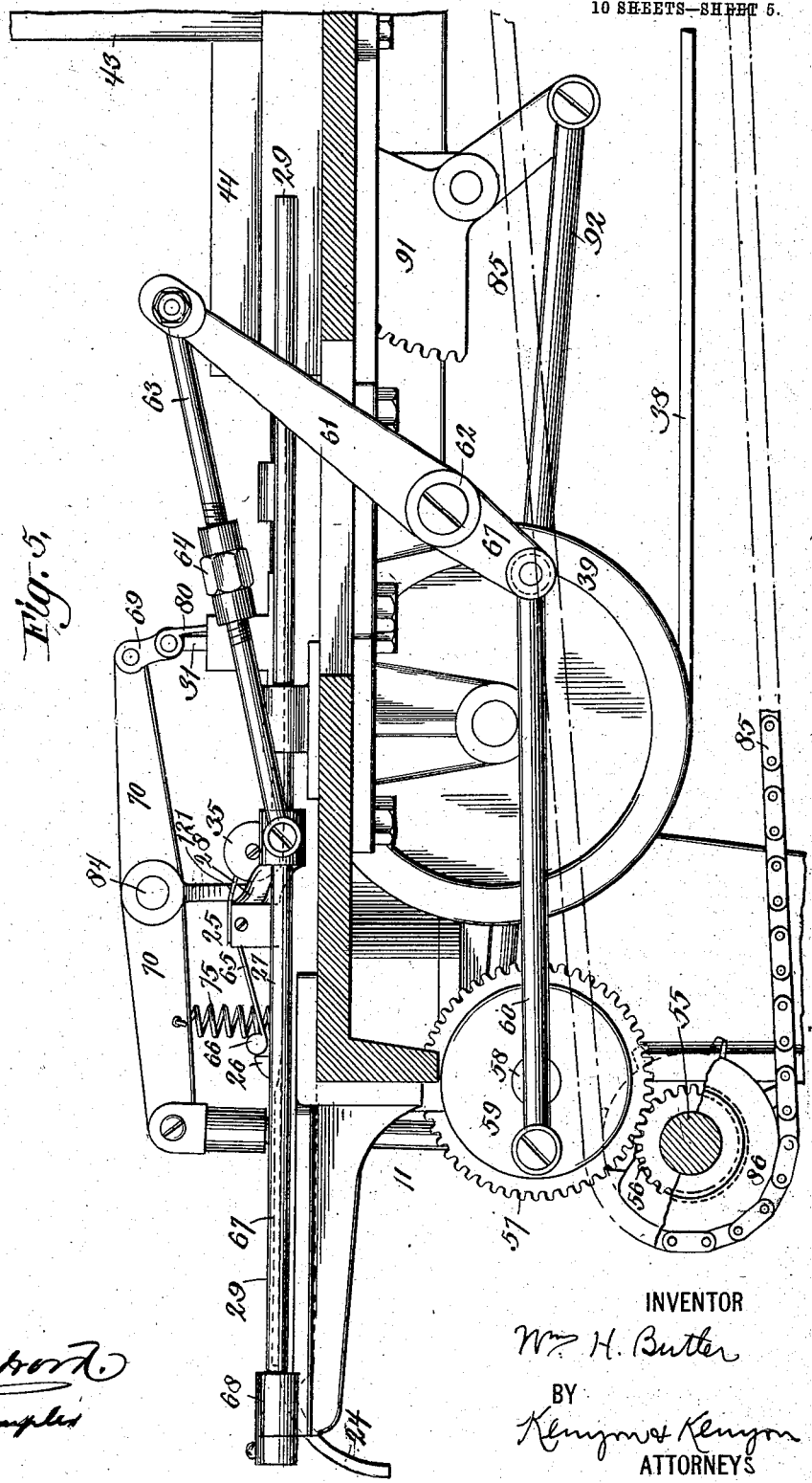

No. 721,667. PATENTED MAR. 3, 1903.
W. H. BUTLER.
MACHINE FOR MAKING AND FILLING BOXES.
APPLICATION FILED MAY 3, 1900.
NO MODEL. 10 SHEETS—SHEET 6.
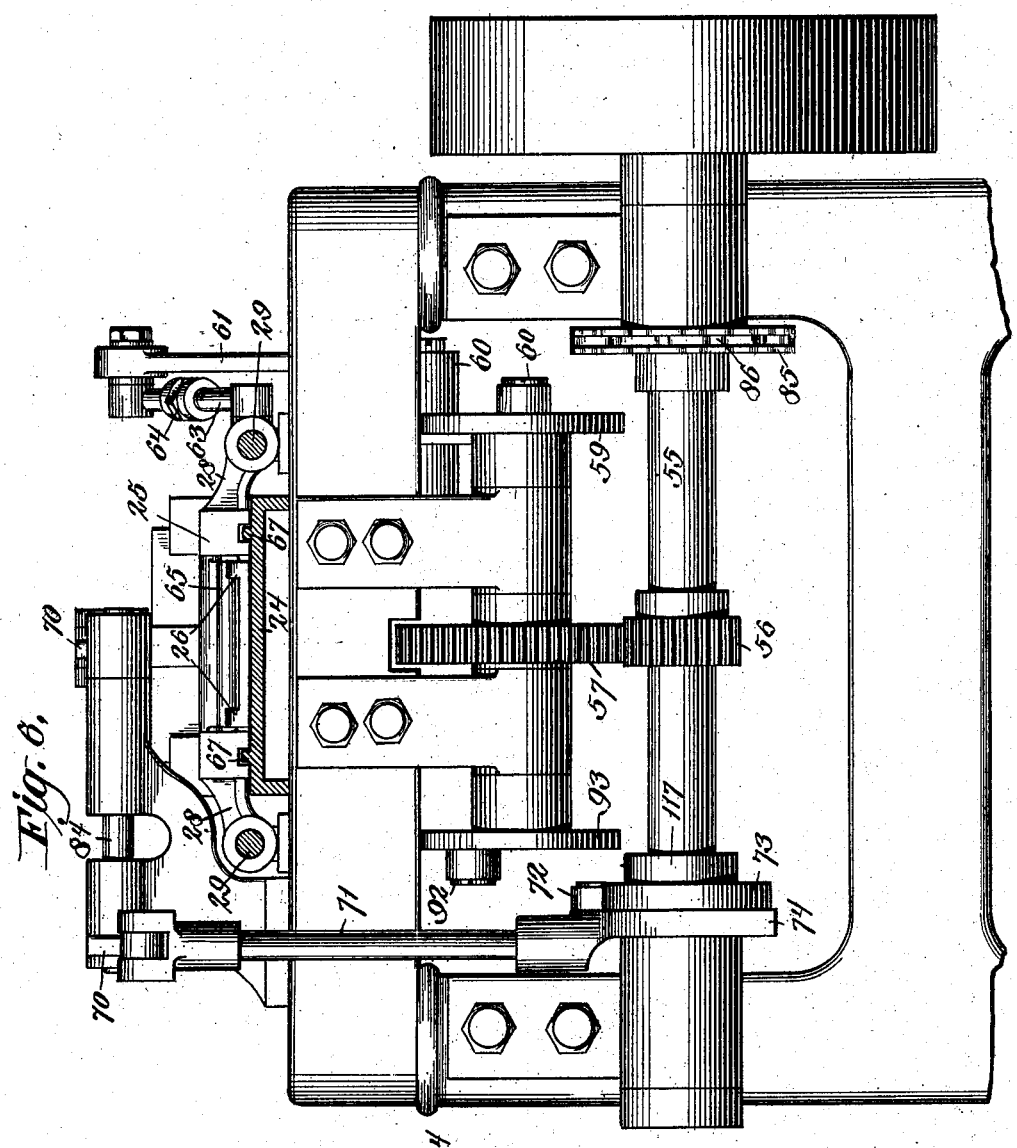
WITNESSES:
INVENTOR
W. H. Butler
BY
Kenyon & Kenyon
ATTORNEYS

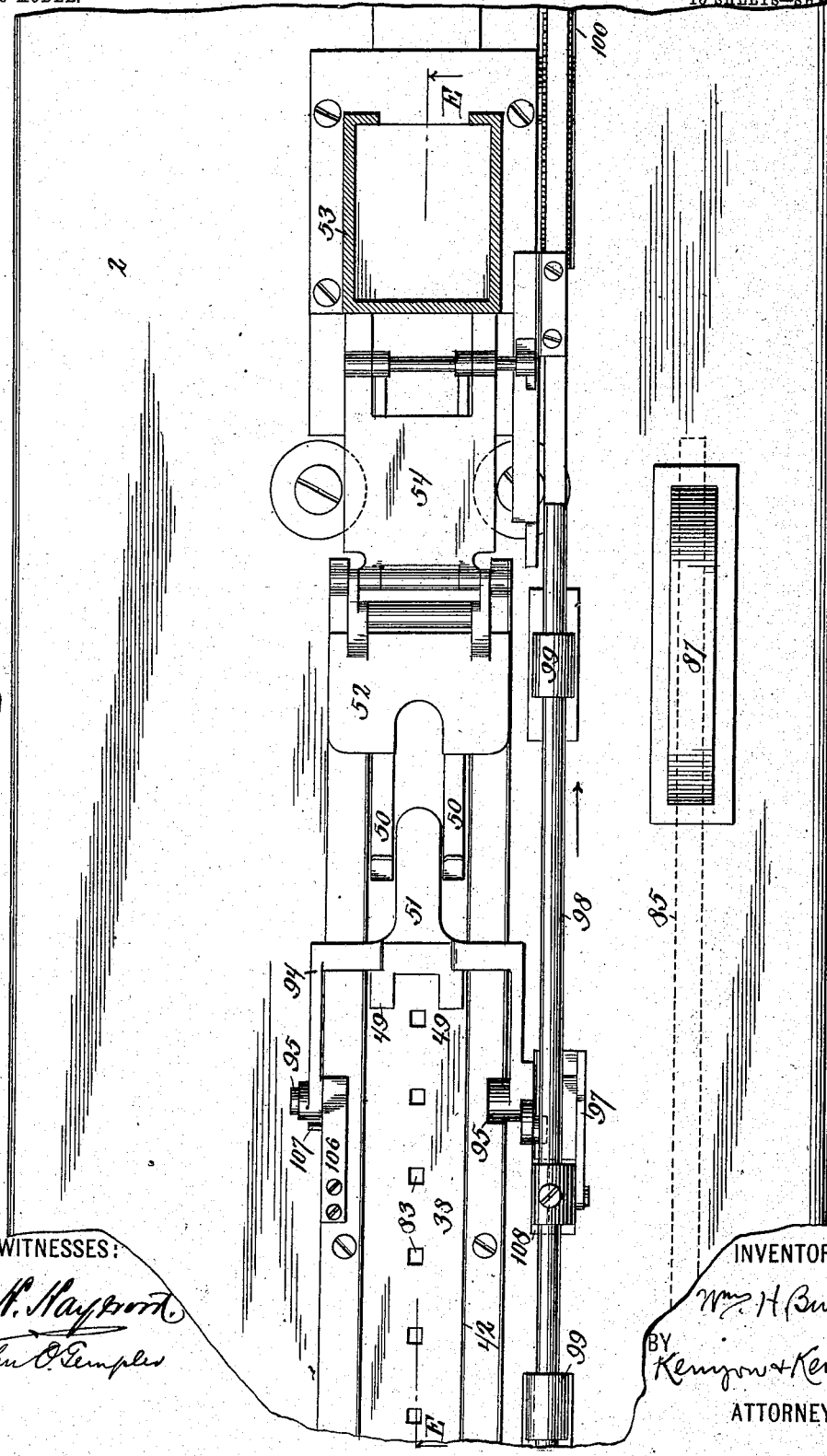

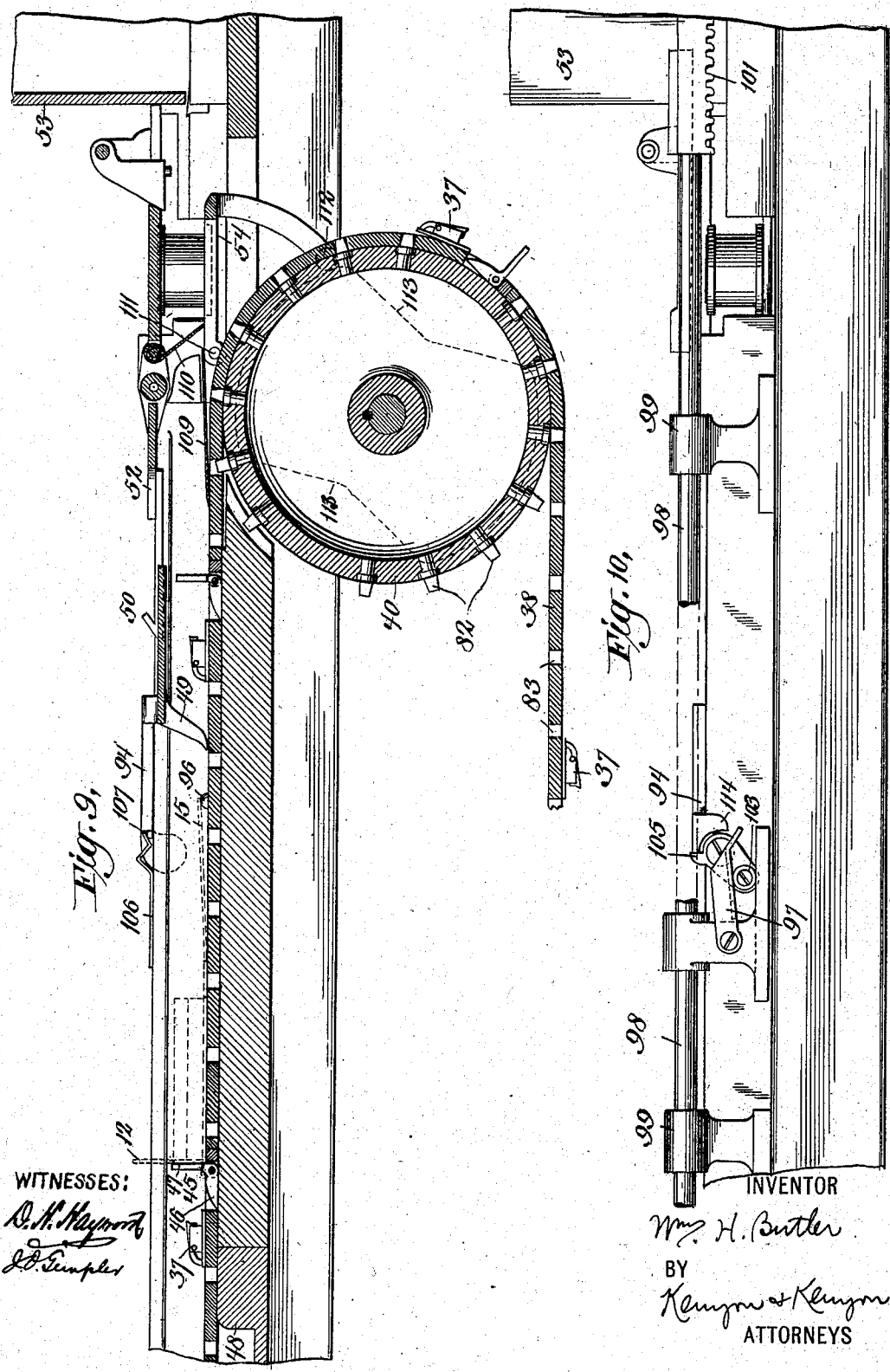

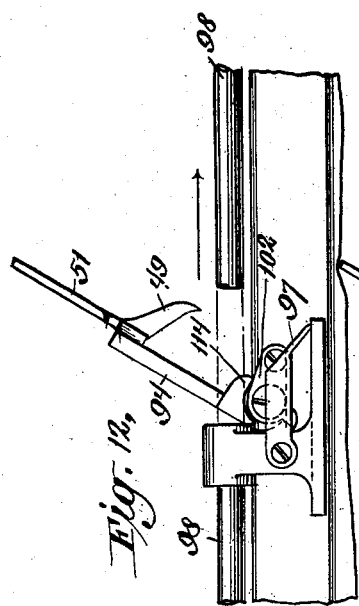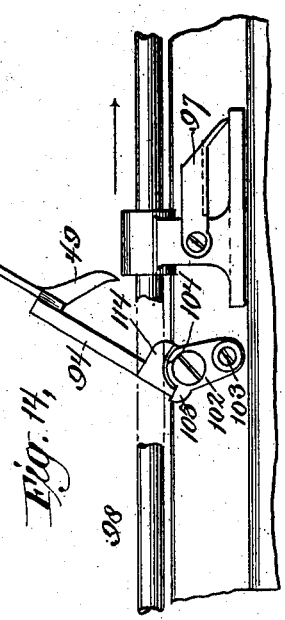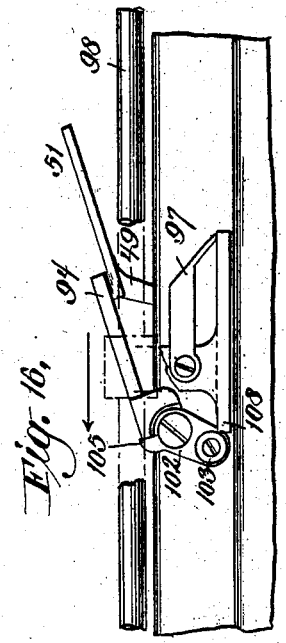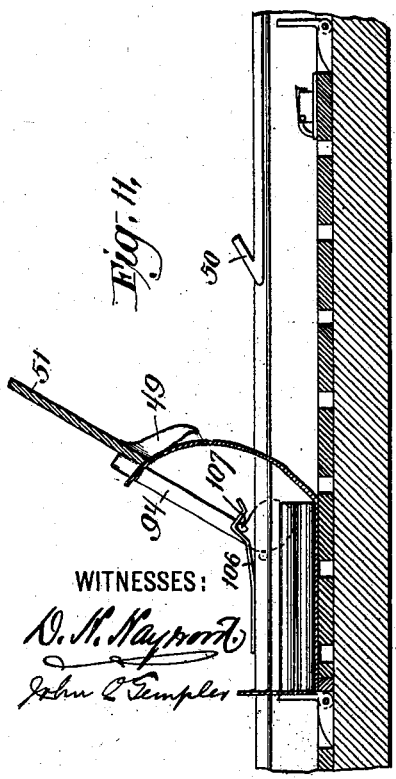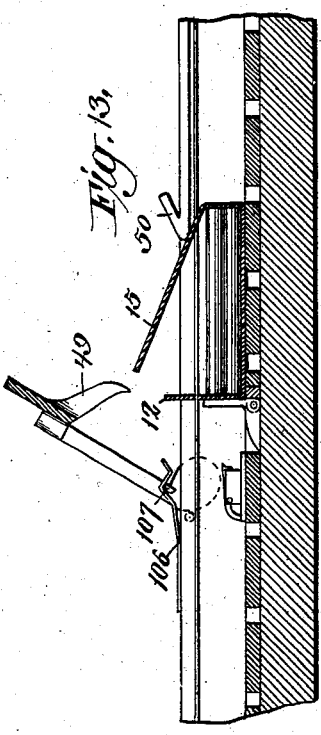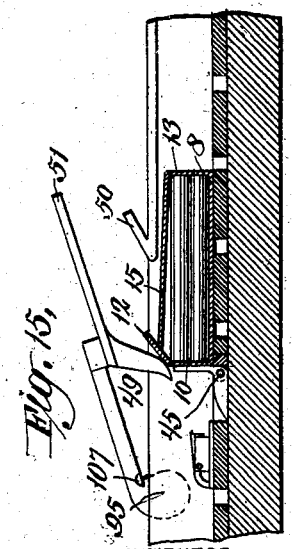

No. 721,667. PATENTED MAR. 3, 1903.
W. H. BUTLER.
MACHINE FOR MAKING AND FILLING BOXES.
APPLICATION FILED MAY 3, 1900.
NO MODEL. 10 SHEETS—SHEET 10.
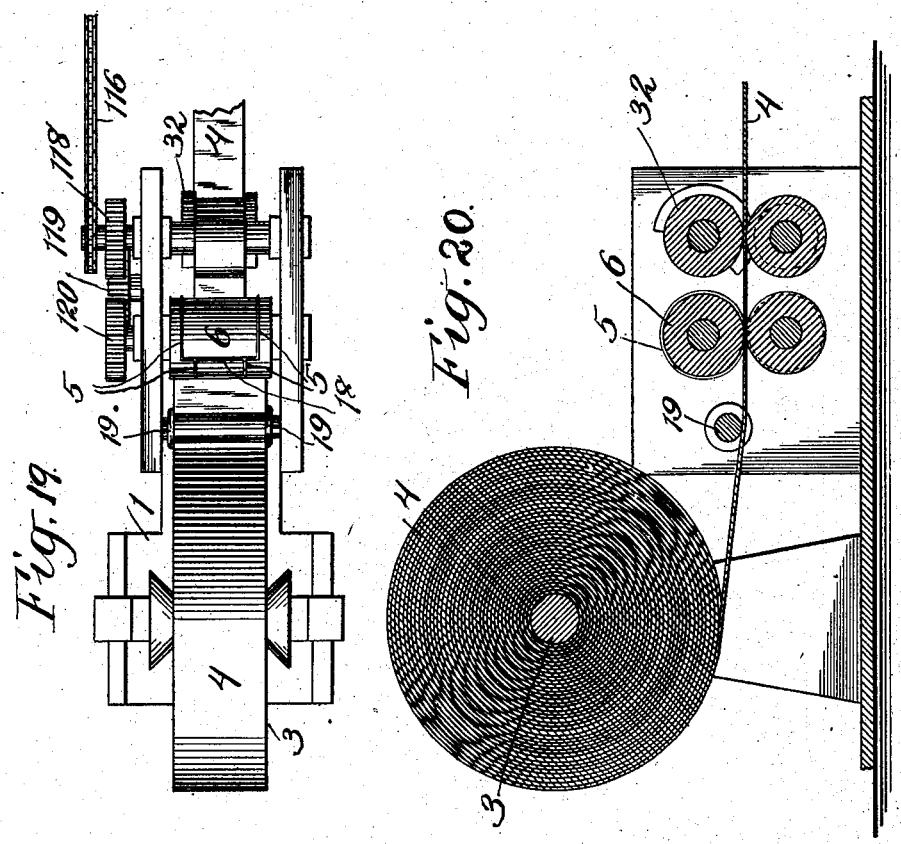
WITNESSES:
INVENTOR
W<sup>m</sup> H. Butler
BY
Kenyon & Kenyon
ATTORNEYS

UNITED STATES PATENT OFFICE.

WILLIAM H. BUTLER, OF NEW YORK, N. Y.

MACHINE FOR MAKING AND FILLING BOXES.

SPECIFICATION forming part of Letters Patent No. 721,667, dated March 3, 1903.

Application filed May 3, 1900. Serial No. 15,331. (No model.)

*To all whom it may concern:*

Be it known that I, WILLIAM H. BUTLER, a citizen of the United States, and a resident of the city, county, and State of New York, have invented certain new and useful Improvements in Machines for Making and Filling Boxes, of which the following is a specification.

My invention relates to machines for making and filling boxes. Its object is to provide a machine that in one continuous operation will automatically cut out blanks for boxes from a strip of paper or other suitable material, score the blanks, make them into completed boxes, fill them with any suitable articles—such, for example, as cigarettes—insert them into shells, and discharge the completed and filled boxes; also, to improve and simplify the scoring of blanks for boxes and to make it possible in one continuous operation to score the blanks in two directions, one transverse to the other, with accuracy and reliability and without interfering with the proper feeding of the blanks and the strip from which they are cut; also, to provide new and improved means for scoring blanks longitudinally; also, for holding the blanks during such scoring operation; also, for feeding the blanks; also, for folding over the front and rear flaps of the blank; also, to generally improve, simplify, and make more efficient machines for making blanks, scoring them, and making boxes out of the blanks and filling the boxes with suitable articles.

It consists of the novel devices and combinations herein shown and described.

In the drawings accompanying this specification and forming a part hereof I have shown and will now proceed to describe the preferred form or embodiment of my invention.

Similar reference characters in the different figures represent corresponding parts.

Referring to the drawings shown, Figure 1 is a plan view of one embodiment of my improved machine for cutting out blanks for boxes from a strip of suitable material, scoring the blanks, making them into boxes and filling them with cigarettes, and inserting the boxes into shells. Fig. 2 is a plan view of that part of my machine in which the blanks are scored longitudinally and are made into boxes and in which the boxes are filled with cigarettes and are then inserted into outer shells and discharged from the machine. Fig. 3 is a plan, on a somewhat larger scale, of that portion of my machine in which the blanks are scored longitudinally, are cut into separate blanks, and in which the sides are turned up to receive the cigarettes. Fig. 4 is a vertical longitudinal section on the lines A A of Fig. 3 viewed as shown by the arrow. Fig. 5 is a similar view taken on the lines B B of Fig. 3 viewed as shown by the arrow. Fig. 6 is a vertical cross-section taken on the lines C C of Fig. 3 viewed as shown by the arrow. Fig. 7 is a vertical cross-section through the ledger and brass plates and some connecting parts, taken on the lines D D of Fig. 4, viewed as shown by the arrow. Fig. 8 is a plan view, on an enlarged scale, of that portion of my machine in which the front and rear flaps are turned up and down upon the cigarettes to form the lid or cover of the box and in which the box is inserted into the shell and discharged from the machine. Figs. 3 and 8 taken together form a large plan of all my machine except the portion for cutting out the blanks from the strip and scoring the blanks transversely and a small part of the center of the machine containing a part of the cigarette-magazine. Fig. 9 is a vertical longitudinal section on the lines E E of Fig. 8 viewed as shown by the arrow. Fig. 10 is a side view of the part shown in Fig. 8. Figs. 11 to 16, inclusive, are detailed views of the apparatus for turning up the front and rear flaps and for turning them down upon the cigarettes. Fig. 17 is a plan of the form of blank which I prefer to use. Fig. 18 is a detail showing the strip of blanks between parts 1 and 2 of the machine. Figs. 19 and 20 are enlarged views of part 1 of the machine, Fig. 19 being a plan view and Fig. 20 being a central vertical longitudinal section.

My improved device embodies in one machine means for cutting blanks for boxes out of a strip of paper or other suitable material, scoring the blanks both transversely and longitudinally, making them into completed boxes and filling the boxes with any suitable articles, preferably cigarettes, and then inserting the completed boxes into shells and discharging the completed and filled boxes from the machine. By my improvement all of these steps are taken in one continuous operation and automatically.

Heretofore attempts have been made to cut out blanks for boxes from a paper strip and to score such blanks longitudinally and transversely of the blanks, and to do this at the same time and in the same operation; but it has heretofore, as far as I am aware, been very difficult, if not impossible, to practically and commercially score the blanks longitudinally and transversely at the same time and in the same operation. It seems to be difficult, if not impossible, to score accurately in the proper places upon the blank. This is due, in part at least, to the fact that the dies used for scoring tend to feed the strip forward or backward, and it has been found practically impossible to feed a strip accurately where there are two or more feeding-points working together or near each other or upon the same strip. Either one or the other feeding-point will feed a little faster than the other, and before long the blanks being scored will begin to fold or will be unduly stretched or torn, and in either case will also be moved out of true alinement in one direction or another. In either case the scorings will very soon become inaccurate either in direction or in location upon the blank. In my improved machine I have separated the longitudinal and transverse scorers and provided separate and distinct and independent means for feeding and alining the strip for each scoring wholly independent of and having no connection with the means for feeding and alining the strip in the part of the machine where the other scoring is done. There is accordingly no conflict between the two rates of feed, and both scorings, the transverse and the longitudinal, are each accurately done in the exact direction and the exact place desired, and this is irrespective of the length of time of the running of my machine.

Referring now to the specific embodiment of my invention shown in the drawings, I will proceed to explain the general construction and operation of the machine and the various steps performed by it in the order in which they are taken.

1 represents the framework of that part of my machine in which the blanks are cut out from a strip of paper or other suitable material and are scored transversely, and 2 represents the framework of that part of my machine in which the other parts of the operation are performed.

3 is the roll upon which the strip 4 is wound, from which the blanks are cut. I provide means in part 1 for cutting the strip into blanks of the desired form, but without severing the blanks from one another. These consist of knives or sharp ribs 5 5, mounted upon roller 6. They are shaped to cut away parts of each side of the strip, except at the side flaps 9 9 of the blank 7, and also to cut out the rounded corners 17 17 of the blanks.

The form of blank I prefer to use is shown in Fig. 17.

8 is the part of the blank which forms the bottom of the box when completed.

9 9 are the side flaps, which form the sides of the box.

10 is the rear flap, which forms the rear of the box. It is scored along the lines 11 11, the part 12 forming a part of the cover or top of the box, as shown in Fig. 15.

13 is the front flap, and it is scored along the lines 14 14, the part 15 being turned over to form a part of the top or cover of the box, as shown in Fig. 15. Between the bottom 8 of the box and on each side of the flaps 9 9 is a line of scoring 16 16. The blank is curved at its forward end at each side of its points 17 17 and also at the rear end of the blank at the points 17 17. The knives 5 5 trim the strip off on each side, except where the side flaps 9 9 are to extend. These knives are spaced upon roller 6, so as to accurately cut the sides from the strips to leave the side flaps 9 9 of the desired length and in the exact position required and so as to bring the rounded corners at the exact points desired. The knives at these points do not cut across the strip, but leave the blanks connected together. Also arranged upon roller 6 are transverse scoring-ribs 18 for making the various transverse scores 11 14 and the scorings 21 21 22 22, which separate bottom 8 of the blank from forward flap 13 and rear flap 10, respectively. One only of these transverse ribs 18 is shown in the drawings. The ribs are of course spaced proper distances apart upon roller 6 for making the various scoring-marks above referred to.

19 19 are guides for properly alining the strip for the cutting devices and the transverse scorers.

32 32 are guides for leading downward and away the pieces cut from the side of the strip. They are mounted upon roller 115. Roller 115 is driven from main shaft 55 through belt 116, running from wheel 117 on shaft 55 to the shaft of roller 115. Gears 118, 119, and 120 transmit motion to roller 6.

The continuous strip of blanks properly cut out and scored transversely passes from part 1 of the machine to part 2. These parts are separated, so as to allow the strip to have some considerable length between the two parts, as shown in Fig. 18. This construction enables the feeding and alining in the two parts of the machine to be entirely separate and independent, and a slight difference in the rate of feed has no injurious effect. As shown, the strip is curved downward at 23. The strip then passes up over the rounded end of plate 24 of part 2. Here it is fed forward and alined by means of a reciprocating frame 25, provided with catches 26, carried by the lower plate-like portion of frame 25. Frame 25 is secured by brackets 28 on each side to reciprocating rods 29. These rods reciprocate, carrying with them frame 25 and catches 26. On the backward movement or toward the left, as shown in Fig. 3, catches 26 pass under the side flaps 9 9 of the blank, and on the forward or return movement the perpendicular front faces of the catches press against the rear ends of these flaps 9 and push the strip forward until the division-line 30 between each blank and its succeeding blank is brought in line with knife 31. At this juncture knife 31 is automatically moved downward and severs one blank from another. The reciprocating frame 25, with its catches 26, then moves backward to seize flaps 9 9 of the next succeeding flap, which is pushed forward in the same manner to the cutting-point.

During the backward movement of frame 25 the longitudinal score-marks 16 16 between the bottom 8 of the blank and the side flaps 9 9 are made by scoring-wheels 33, which constitute a reciprocating scorer. These wheels are secured to a sleeve loosely mounted upon a shaft 34, carried by roller-wheels 35 at each end, shaft 34 being mounted in frame 25. In order to prevent buckling or pulling backward of the blank when being scored, a rubber gripper 36 is connected with knife 31. When the knife falls and severs two blanks, gripper 36 presses down upon and grips the forward end of the blank and holds it securely while scoring-wheels 33 are moving backward and scoring the blank. After the blank has thus been scored longitudinally and severed from the succeeding blank it is fed forward first by means of pickers 37, secured to an endless belt 38, which travels around wheels 39 and 40. These pickers 37 push the blank forward under guides 41 and into trough 42, where the gradually rounded and converging side walls of the same turn the side flaps 9 9 upward. When the bottom of the blank registers with cigarette-magazine 43, the proper number of cigarettes are pushed out of the magazine upon the bottom of the blank by plunger 44. Next folders 45, secured to the belt, fold up the rear flap 10 12 into an upright position. The folders before this operation have occupied the position shown at the top of the belt in Fig. 4 by reason of the part 46 being heavier than the part 47 of the folder. The part 46 at this juncture strikes a cam 48 (shown in Fig. 9,) and is forced into a horizontal position, forcing part 47 into a vertical position, thus turning up the rear flap 10, which at this point lies immediately above it. This is shown in Fig. 9. From this point on folder 45 pushes the box forward instead of pickers 37. The forward flap 13 15 is then turned partially upward by means of folder 49, and this operation is completed, and the part 15 of the forward flap is turned down upon the top of the cigarettes by projections 50. The upper part 12 of rear flap 10 is turned downward by means of folder 49 and its extension-arm 51. The filled box then passes along the trough under guide 52 to the device for inserting it into a shell. The shells are fed out from shell-magazine 53 to meet the box. The completed filled box then passes out onto platform 54, which at this juncture tilts downward, discharging the box from the machine into any suitable receptacle.

Frame 25 is moved backward and forward by the following means: 55 is the main driving-shaft of the machine. 56 is a gear mounted upon the shaft and meshing with gear 57 upon a shaft 58. Upon shaft 58 is also mounted a wheel 59, to which is secured a crank-shaft 60. To the end of this is secured a lever 61, pivoted at 62 in the framework of the machine and carrying loosely pivoted at its upper end a rod 63. Rod 63 is secured to the end of one of the arms 28 of frame 25. As shown, gears 56 and 57 are geared two to one in order to give the proper reciprocating action to the carriage and to correctly time its movements. By means of nut 64 on rod 63 the position of the carriage can be delicately and accurately adjusted.

65 is a plate loosely pivoted at its upper end in the frame 25 and weighted at its rear edge 66. The object of this plate is to press the rear end of the blank down upon the upper surface of the flat portion 27 of frame 25. This insures that the catches will strike and push forward the sheet and also aids in holding the blank flat when the longitudinal scoring-marks are made upon it. While the scoring-wheels 33 are making the longitudinal scorings, wheels 35 run upon the surface of plate 24. In order to prevent the scoring-wheels from cutting or wearing this plate when they are not running upon the blanks and making the scoring-marks between the side flaps and the bottom of the blank, I arrange rails 67, upon which wheels 35 ride, thus raising scoring-wheels 33 above the surface of plate 24. Rods 29 oscillate backward and forward in bearings 68, secured to the framework of the machine. The inner vertical walls of the raised sides of reciprocating frame 25 constitute guides between which the blanks are properly alined for the longitudinal scorer. Scoring-wheels 33 are pressed down upon the blanks by springs 121, secured to the raised sides of frame 25, and pressing down upon collars 122, loose upon shaft 34.

The means shown for raising and lowering knife 31 are as follows: Knife 31 is connected by arm 69 to one end of the walking-beam 70, the other end of the walking-beam being operated through rod 71, having a roller 72 at its lower end which runs upon a cam 73, mounted on the main shaft 55. Forks 74 at the end of the rod 71 encircle shaft 55 in the usual manner. Gripper 36 is also connected with arm 69 and knife 31 and moves with them. 75 is a spring attached at one end to walking-beam 70 and at the other end to the framework of the machine and presses roller 72 down upon cam 73. 76 is a guide for holding down the blank as it passes from the surface of frame 25 onto ledger-plate 77. An opening 78 is made through plate 24, and an opening 79 is made in the bottom of ledger-plate 77, so as to register with each other, as shown in Figs. 7 and 4, to permit pickers 37 to come up behind the end of the blank after it has been cut and to project above the upper surface of plate 24 in order to engage with the rear end of the blank. In order to push the blank downward, I loosely mount upon arm 69 an arm 80, weighted at its lower end at 81, as shown in Figs. 4 and 3. This weighted arm falls with the knife and presses the rear end of the forward blank below the surface of the forward end of ledger-plate 77 and down upon the surface of plate 24, so that picker 37 will be sure to engage with it.

Wheels 39 and 40 are provided with projecting pins 82, which are adapted to engage with holes 83 in endless belt 39 to insure a more positive and accurate feed of the belt. Wheel 40 is positively driven from main shaft 55 by means of sprocket-chain 85, which runs over sprocket-wheel 86 on the main shaft and runs to a similar sprocket-wheel 87 on the same shaft as that of wheel 40. The upper part of the belt is thus pulled forward by wheel 40, and wheel 39 is driven from it through endless belt 38.

One half of walking-beam 70 is connected to shaft 84 at one side of the machine, as shown in Fig. 3, and the other half of the walking-beam is connected with the same shaft at the center of the machine, as also shown in that figure, the central half carrying arm 69, supporting the knife, gripper, and weighted arm.

The curved converging sides of trough 42 for turning up the side flaps of the blank are indicated in Fig. 4, but are not shown in full detail, as they have been fully described in an earlier application of mine. The means for feeding the cigarettes into and down magazine 43 and the means for operating plunger 44 form no part of my present invention, as they are well known and have been described by me in previous applications and they will not be further described than to say that plunger 44 is reciprocated by means of arm 88, upon which it is mounted, arm 88 being secured to rod 89, reciprocating in bearings 90, secured to the framework of the machine, rod 80 being reciprocated by means of a toothed segment 91, the teeth of which mesh with teeth (not shown) on the under side of rod 89, the segment being operated through crank-arm 92, secured to wheel 93 on shaft 58.

I will now proceed to describe with more detail the operation of the folders for turning the rear and front flaps up and then down upon the top of the cigarettes. I turn the forward flap of the box up and the upper part of the rear flap down upon the box by means of a folder having two faces, one face adapted to engage with the forward flap and the other face adapted to engage with the upper part of the rear flap, and I provide means to move the folder to cause it to engage successively with said flaps. As shown, folder 49 consists of two parts or folders. Folders 49 are carried by a swinging frame 94, pivoted to the framework of the machine at 95 on each side of the trough. Normally folders 49, with their extension 51, which forms a continuation of one face of the folders, occupy a horizontal position, folders 49 projecting into the trough and extension 51 lying in the opening between projections 50, as shown in Figs. 8 and 9. In order to insure that the forward flap 15 shall pass over the toe or lower end of folders 49, I place at the proper points upon the outer surface of the endless belt projections 96, as shown in Fig. 9. One of these projections slightly lifts the forward flap, and as the box is pushed forward the forward end passes up the inclined face of folders 49. When this forward movement has been well started, frame 94, with folders 49, is quickly raised into the position shown in Fig. 11. This is accomplished in the form of my device shown in the drawings by means of a reciprocating cam 97, secured to a reciprocating rod 98, which moves back and forth in bearings 99, secured to the framework of the machine. This rod 99 is moved by means of a toothed segment 100, the teeth of which mesh with teeth 101, secured to rod 98. The means for moving the segment back and forth form no part of this invention, and as they are shown and described in an earlier application of mine they will not be further described. Loosely pendent from frame 94 is a piece 102, provided at its lower end with a roller 103 and curved at its upper end 104 and also having a thumb 105, as clearly shown in Fig. 14. As rod 98 moves in the direction of the arrow shown in Figs. 8, 12, and 14 roller 103 rises on the inclined forward end of cam 97 and through rounded end 104 on piece 102, and toe 114 on frame 94 raises that frame into the position shown in Figs. 11 and 12, a spring 106, with a notch in it, catching and holding frame 94 in its upward position by means of the notch catching over pin 107, projecting from one side of frame 94. This upward movement of frame 94 and folders 49 raises the forward flap into the position shown in Fig. 11. As the box is pushed forward the forward flap slips from under folders 49 and is caught by stationary folders 50, which project over the trough on both sides, as shown in Figs. 8 and 11. This position of the parts is clearly shown in Figs. 13 and 14. As the box is pushed still farther part 15 of the forward flap is entirely pushed down upon the cigarettes. The upward part 12 of the rear flap is partly turned down by the folders 49 in their downward movement. This downward movement is accomplished by the following means: Rod 98 having reached the end of its forward movement returns backward and causes the corner 108 of the base, which carries cam 97, to strike a sharp blow upon roller 103 of piece 102, moving piece 102 sharply into the position shown in Fig. 16. In thus moving finger 105 disengages frame 94 from notch 107 in spring 106 and forces folders 49 sharply downward. In their downward course the forward curved end of these folders strikes upon flap 12, as shown in Fig. 15, and bends it downward. The downward motion of the folders is so rapid that the curve on the front of the folders forces this flap a considerable distance downward. These folders are preferably curved, so as to do this. This downward movement is completed by extension 51 pressing down upon flap 12 and flap 15, pressing them closely upon the cigarettes, and in the further backward motion of rod 98 cam 97 rides up on and over roller 103, as shown in Fig. 10.

By the above means the front and rear flaps are accurately and correctly turned upward and bent downward, and the work is accomplished with certainty and precision. The means employed by me for this purpose are simple and efficient and do not easily get out of order. Any suitable means may be employed for feeding the shells out from the shell-magazine 53 to meet the box. As these devices form no part of my present invention and as they are fully shown and described in an earlier application of mine, they will not be here further described.

The filled box rides up an incline 109 and passes into and through a wedge-shaped device (indicated at 110 in Fig. 9) and is forced into the outer shell. The details of this mechanism form no part of the present invention and are fully set forth in a prior application of mine and will not, therefore, be further described. The completed and filled box then passes out upon swinging platform 54, which is pivoted at 111. This platform is swung downward and upward by means of a roller 112 at its lower end engaging with a cam 113, mounted upon the shaft of wheel 40. The cam is so arranged that as the completed and filled box is thrust out upon the platform the platform tilts downward and discharges the box into any suitable receptacle that may be provided for it.

Many changes and modifications may of course be made in the apparatus shown in the drawings without departing from my invention, the essentials of which are set forth in the claims appended hereto.

By my improved device boxes can be made and filled with any suitable article and be inserted in shells in one machine and in one continuous automatic operation. The boxes can thus be made very rapidly and cheaply. The scoring of the blanks is effected with accuracy and precision. The devices for turning up the flaps are simple, efficient, and work with great rapidity.

What I claim as new, and desire to secure by Letters Patent, is—

1. The combination in a machine of cutting devices for cutting a strip of suitable material into blanks without severing the blanks from one another, scoring devices for scoring the blanks longitudinally and transversely, a knife for severing the blanks from each other, devices for alining and feeding the strip through the cutting and scoring parts of the machine to the knife, means for making the blanks into boxes, and devices for feeding forward the separate severed blanks through the box making and filling parts of the machine, whereby in one automatic and continuous operation the strip may be cut into blanks without severing the blanks from one another, and be scored transversely and longitudinally, the blanks be severed from one another and be made into boxes, and the boxes be filled with suitable articles.

2. The combination in a machine of cutting devices for cutting a strip of suitable material into blanks without severing the blanks from one another, scoring devices for scoring the blanks longitudinally and transversely, a knife for severing the blanks from each other, devices for alining and feeding the strip through the cutting and scoring parts of the machine to the knife, means for making the blanks into boxes, means for inserting the filled boxes into shells and devices for feeding forward the separate severed blanks through the box making, filling and covering parts of the machine, whereby in one automatic and continuous operation the strip may be cut into blanks without severing the blanks from one another, and be scored transversely and longitudinally, the blanks be severed from one another and be made into boxes, and the boxes be filled with suitable articles and be inserted into outer shells.

3. The combination in a machine of cutting devices for cutting a strip of suitable material into blanks without severing the blanks from one another, scoring devices for scoring the blanks longitudinally and transversely, a knife for severing the blanks from each other, devices for alining and feeding the strip through the cutting and scoring parts of the machine to the knife, means for making the blanks into boxes, means for inserting the filled boxes into shells, means for discharging the filled and covered boxes from the machine and devices for feeding forward the separate severed blanks through the box making and discharging parts of the machine, whereby in one automatic and continuous operation the strip may be cut into blanks without severing the blanks from one another, and be scored transversely and longitudinally, the blanks be severed from one another and be made into boxes, the boxes be filled with suitable articles and be inserted into outer shells, and be discharged from the machine.

4. In a machine for scoring strips, the combination of a longitudinal scorer and a transverse scorer, separate from and independent of each other, and means for alining and feeding the strip to each scorer separate and independent of the means for alining and feeding the strip to the other scorer, whereby the strip may be scored both longitudinally and transversely as desired without interference by either scorer with the work of the other.

5. In a machine for scoring strips the combination of a transverse scorer, means for alining and feeding the strip to said scorer, all arranged in one part of the machine, and a longitudinal scorer and separate and independent means for alining and feeding the strip to it arranged in another part of the machine, whereby the strip may be scored one way in one part of the machine, be released from alinement in passing to the scorer in the other part of the machine and be independently realined and fed to the latter scorer.

6. In a machine for scoring strips, the combination of cutting devices for cutting a strip of suitable material into blanks without severing the blanks from one another, a longitudinal scorer and a transverse scorer, separate from and independent of each other, and means for alining and feeding the strip to each scorer separate and independent of the means for alining and feeding the strip to the other scorer, whereby the strip may be cut into blanks of the desired shape without severing the blanks from one another, and be scored both longitudinally and transversely as desired without interference by either scorer with the work of the other.

7. In a machine for scoring strips the combination of cutting devices for cutting a strip of suitable material into blanks without severing the blanks from one another, scoring devices for scoring the blanks longitudinally and transversely, a knife for severing the blanks from each other, devices for alining and feeding the strip through the cutting and scoring parts of the machine to the knife, means for making the blanks into boxes, and devices for feeding forward the separate severed blanks through the box-making parts of the machine and cutting devices for severing the blanks from one another, whereby the strip may be cut into blanks of the desired shape without severing the blanks from one another, and be scored both longitudinally and transversely as desired without interference by either scorer with the work of the other, and the blanks be severed from one another.

8. In a machine for scoring strips the combination of a reciprocating scorer adapted to score the strips longitudinally, means for feeding and alining the strip to bring it into proper position to be acted upon by the scorer, and means for moving the scorer over the part of the strip to be scored whereby the strip may be scored longitudinally.

9. In a machine for scoring strips the combination of a reciprocating scorer adapted to score the strips longitudinally, means for feeding and alining the strip to bring it into proper position to be acted upon by the scorer, means for moving the scorer over the part of the strip to be scored, and means for holding the strip in such position during the scoring operation whereby the strip may be scored longitudinally.

10. In a machine for scoring strips the combination of a reciprocating frame provided with catches for engaging with and feeding forward the strip when the plate moves in one direction, means for alining the strip, scoring-wheels connected to the reciprocating frame and adapted to score the strip longitudinally when the frame moves in the other direction, and a gripper for holding the strip stationary during the scoring operation, whereby the strip may be scored longitudinally.

11. In a machine for scoring strips the combination of a reciprocating frame provided with catches for engaging with and feeding forward the strip when the plate moves in one direction, means for pressing down the strip in front of the catches, means for alining the strip, scoring-wheels connected to the reciprocating frame and adapted to score the strip longitudinally when the frame moves in the other direction, and a gripper for holding the strip stationary during the scoring operation, whereby the strip is fed and scored longitudinally with certainty and precision.

12. In a machine for scoring strips the combination of a reciprocating frame provided with catches for engaging with and feeding forward the strip when the plate moves in one direction, means for alining the strip, scoring-wheels connected to the reciprocating frame and adapted to score the strip longitudinally when the frame moves in the other direction, and a gripper for holding the strip stationary during the scoring operation, springs for pressing the scoring-wheels against the strip, whereby the strip may be scored longitudinally.

13. In a machine for scoring strips the combination of a reciprocating frame provided with catches for engaging with and feeding forward the strip when the plate moves in one direction, means for alining the strip, scoring-wheels connected to the reciprocating frame and adapted to score the strip longitudinally when the frame moves in the other direction, and a gripper for holding the strip stationary during the scoring operation, wheels connected with and carrying the scoring-wheels and raised rails for said wheels to lift the scoring-wheels from the surface of the machine when not scoring, whereby the strip may be scored longitudinally.

14. In a machine for making boxes out of blanks, a folder having two faces, one face adapted to engage with the forward flap of a box to turn it up and the other face adapted to engage with the upper part of the rear flap to turn it down upon the box, and means for moving the folder to cause it to engage successively with the forward and rear flaps.

15. In a machine for making boxes out of blanks, a folder having two faces, one face adapted to engage with the forward flap of a box to turn it up and the other face adapted to engage with the upper part of the rear flap to turn it down upon the box, means for moving the box forward to bring its flaps into position to be acted upon by the folder, and means for moving the folder to cause it to engage successively with the forward and rear flaps.

16. In a machine for making boxes out of blanks, means for turning the rear flap upright, a folder having two faces, one face adapted to engage with the forward flap of a box to turn it up and the other face adapted to engage with the upper part of the rear flap to turn it down upon the box, and means for moving the folder to cause it to engage successively with the forward and rear flaps.

17. In a machine for making boxes out of blanks, means for turning the rear flap upright, a folder having two faces, one face adapted to engage with the forward flap of a box to turn it up and the other face adapted to engage with the upper part of the rear flap to turn it down upon the box, means for moving the box forward to bring its flaps into position to be acted upon by the folder, and means for moving the folder to cause it to engage successively with the forward and rear flaps.

18. In a machine for making boxes out of blanks, a folder having two faces, one face adapted to engage with the forward flap of a box to turn it up and the other face adapted to engage with the upper part of the rear flap to turn it down upon the box, means for moving the folder to cause it to engage successively with the forward and rear flaps, and a projection lying in the path of the box and immediately over it to turn down the forward flap upon the box when released by the folder.

19. In a machine for making boxes out of blanks, a folder having two faces, one face adapted to engage with the forward flap of a box to turn it up and the other face adapted to engage with the upper part of the rear flap to turn it down upon the box, a reciprocating cam adapted while moving in one direction to raise the folder and turn up the forward flap, a spring for holding the folder in its raised position, and means for releasing the folder and moving it downward to turn down the upper part of the rear flap.

20. In a machine for making boxes out of blanks, a folder having two faces, one face adapted to engage with the forward flap of a box to turn it up and the other face adapted to engage with the upper part of the rear flap to turn it down upon the box, means for moving the folder to cause it to engage successively with the forward and rear flaps, and a projection lying in the path of the box and immediately over it to turn down the forward flap upon the box when released by the folder, and a projection from the forward face of the folder adapted to be moved down over the path of the box alongside of the said projection to insure the complete folding of the flaps along the top of the box.

21. In a machine for making boxes out of blanks, a folder having two faces, one face adapted to engage with the forward flap of a box to turn it up and the other face adapted to engage with the upper part of the rear flap to turn it down upon the box, a spring-catch for seizing and holding the folder when raised upward, a piece loosely pendent from the folder and having a projection on each side, one projection adapted, when the pendent piece is moved one way, to engage with the folder to raise it, the other projection adapted, when the pendent piece is moved the other way, to engage with the folder and release it from the spring and force it downward, a reciprocating piece adapted to move the pendent piece one way to raise the folder and then the other way to lower it.

In testimony whereof I have signed my name to this specification in the presence of two subscribing witnesses.

WILLIAM H. BUTLER.

Witnesses:
B. M. COLE,
EDWIN SEGER.